US007386421B2

(12) United States Patent
Miki

(10) Patent No.: US 7,386,421 B2
(45) Date of Patent: Jun. 10, 2008

(54) CONTROL SYSTEM AND LIGHTING CONTROL SYSTEM

(75) Inventor: Mitsunori Miki, Kyoto (JP)

(73) Assignee: The Doshisha, Kyoto (JP)

( * ) Notice: Subject to any disclaimer, the term of this patent is extended or adjusted under 35 U.S.C. 154(b) by 0 days.

(21) Appl. No.: 10/576,687

(22) PCT Filed: Mar. 23, 2004

(86) PCT No.: PCT/JP2004/003981

§ 371 (c)(1),
(2), (4) Date: Apr. 21, 2006

(87) PCT Pub. No.: WO2005/062139

PCT Pub. Date: Jul. 7, 2005

(65) Prior Publication Data

US 2007/0100571 A1 May 3, 2007

(30) Foreign Application Priority Data

Dec. 24, 2003 (JP) ............................ 2003-426230

(51) Int. Cl.
*G06F 11/30* (2006.01)
*G05D 23/00* (2006.01)

(52) U.S. Cl. ...................... 702/183; 700/291; 700/295

(58) Field of Classification Search .................. 702/96, 702/82, 84, 183, 150; 700/276, 291, 295
See application file for complete search history.

(56) References Cited

U.S. PATENT DOCUMENTS 7,216,021 B2 * 5/2007 Matsubara et al. ......... 700/295

FOREIGN PATENT DOCUMENTS

| | | | |
|---|---|---|---|
| JP | 06-198585 | A | 7/1994 |
| JP | 06-203283 | A | 7/1994 |
| JP | 2002-260403 | A | 9/2002 |

OTHER PUBLICATIONS

Mitsunori Miki et al. "Design of Intelligent Lighting System," The Science and Engineering Review of Doshisha University, pp. 24-34, vol. 39, No. 2 (Jul. 1998).
International Search Report.

* cited by examiner

*Primary Examiner*—Bryan Bui
(74) *Attorney, Agent, or Firm*—Rader, Fishman & Grauer, PLLC

(57) ABSTRACT

The invention judges whether or not the relation between an illumination at a desired position and a target illumination satisfies a predetermined condition, and causes the illumination at the desired position to approach the target illumination by letting a plurality of lighting devices successively perform a procedure of increasing/decreasing their respective light intensities based on a result of the judgment. The illumination at the desired position is caused to approach the target illumination by randomly varying the light intensities of the lighting devices, making comparison between the illumination at the desired position and the target illumination, and narrowing the width of variation based on a result of the comparison. When the electric power consumption has increased, the light intensities are returned to the previous values. Furthermore, there is provided a control terminal device for control that can be used for other control amounts.

24 Claims, 8 Drawing Sheets

(A)

(B)

CONTROL SYSTEM AND LIGHTING CONTROL SYSTEM

TECHNICAL FIELD

The present invention relates to an intelligent control system and an intelligent lighting control system that can be used for lighting control for example, the control systems being capable of reduction of energy consumption, as well as flexible control and management of illumination, for example.

BACKGROUND ART

With conventional lighting systems, when numerous light sources are provided in a hall for example, the light intensities of the light sources are adjusted individually to set the illumination appropriately for numerous locations inside the hall. With such a technique, it is necessary to repetitively adjust each of the light sources using trial and error to set the illumination at a predetermined position to a desired value. Also, it is necessary to adjust the light intensity of each of the light sources regularly or for each performance, if the illumination of the lamps changes over time. Similarly, adjustments are necessary when the illuminant has degraded and is replaced. And in conference rooms or the like, the immediate optimal illumination varies when the outside light from a window varies.

On the other hand, systems capable of sensing the condition of each light source, detecting malfunctions, and remotely controlling the respective illuminations of the light sources are known as intelligent lighting systems (for example see *Shomei Shisutemu no Chitekika Sekkei* (Incorporating Greater Intelligence in the Design of Lighting Systems), Mitsunori Miki and Takafumi Kozai, Doshisha University, Science and Engineering Research Report, July 1998, Volume 39, No. 2, pp 24-34).

DISCLOSURE OF INVENTION

However, with the systems in the above-described conventional technology, in order to set a desired illumination in desired locations in audience seats and on stage for example, trial and error and adjustments have been necessary as with conventional systems.

On the other hand, although commonly known automatic control may be used to adjust a single point of illumination of a single light source to a predetermined target value, in cases such as where a plurality of light sources are used and the overall illumination distribution in a room is to be set to a desired condition, it has not been easy to solve the issues of adjusting a plurality of control targets to set and maintain a condition in which a plurality of target values are met.

An object of the present invention is to provide a lighting control system capable of setting the illumination of a predetermined position to a desired illumination and reducing the energy consumption, using a plurality of lighting devices in places such as in a hall, in an ordinary room, and outdoors. Furthermore, it is an object to provide a control system that is compatible not only with lighting control, but also with similar control issues.

In order to solve the above-described issues, a lighting control system of the present invention employs the following means.

(1) A control system, including an energy measurement portion, a plurality of control portions, at least one comparison portion, and at least one judgment portion, wherein the energy measurement portion sends to the judgment portion energy information relating to energy consumed by the control portions, the comparison portion sends to the judgment portion a comparison result in which observation information of an arbitrary position and target information are compared, the judgment portion carries out a judgment as to whether a predetermined condition is met, based on the energy information and the comparison result, and sends a result of the judgment to the control portions, and the control portions repetitively increase/decrease a control amount based on the judgment result obtained from the judgment portion, and, when the energy consumption has increased or has not decreased as a result of the increase/decrease of the control amount, cause the observation information to approach the target information by returning the control amount to a previous value.

(2) A control system, including an energy measurement portion, a plurality of control portions, at least one comparison portion, and at least one judgment portion, wherein the energy measurement portion sends to the judgment portion energy information relating to energy consumed by the control portions, the comparison portion sends to the judgment portion a comparison result in which observation information of an arbitrary position and target information are compared, the judgment portion carries out a judgment as to whether a predetermined condition is met, based on the energy information and the comparison result, and sends a result of the judgment to the control portions, the comparison portion sends the comparison result without specifying a destination when sending the result to the judgment portion, and/or the judgment portion sends the judgment result without specifying a destination when sending the result to the control portions, and the control portions repetitively increase/decrease a control amount based on the judgment result obtained from the judgment portion, and, when the energy consumption has increased or has not decreased as a result of the increase/decrease of the control amount, cause the observation information to approach the target information by returning the control amount to a previous value.

(3) A control system, including an energy measurement portion, a plurality of control portions, at least one comparison portion, and at least one judgment portion, wherein the energy measurement portion sends to the judgment portion energy information relating to an amount of energy consumed by the control portions, the comparison portion includes a sampling portion that samples observation information and a storage portion that has target information, and sends to the judgment portion a comparison result in which the observation information and the target information are compared, the judgment portion carries out a judgment as to whether a predetermined condition is met, based on the energy information and the comparison result, and sends a result of the judgment to the control portions, the control portions are capable of carrying out, based on the judgment result, variation control in which a current control value is changed by a predetermined variation amount, and return control, the observation information is generated based on control values controlled by the plurality of control potions, the control portions carry out the variation control through at least one of: setting of the predetermined variation amount as an amount that is varied randomly; setting of a return variation amount in the return control as an amount that is varied randomly; random changing of a timing for carrying out the variation control; and random changing of the frequency of the variation control, and return the control amount to a previous value when the energy consumption has increased or has not decreased as a result of the change in the control amount, and, when the judgment is that the predetermined condition is not met after the variation control, the control portions cause the observation information to approach the target information by returning the control amount to a previous value so that the predetermined condition is met.

(4) A control system, including an energy measurement portion, a plurality of control portions, at least one comparison portion, and at least one judgment portion, wherein the energy measurement portion sends to the judgment portion energy information relating to an amount of energy consumed by the control portions, the comparison portion includes a sampling portion that samples observation information and a storage portion that has target information, and sends to the judgment portion a comparison result in which the observation information and the target information are compared, the judgment portion carries out a judgment as to whether a predetermined condition is met, based on the energy information and the comparison result, and sends a result of the judgment to the control portions, the control portions are capable of carrying out, based on the judgment result, variation control in which a current control value is changed by a predetermined variation amount, and return control, the observation information is generated based on control values controlled by the plurality of control potions, the control portions carry out the variation control by through at least one of: setting of the predetermined variation amount as an amount that is varied randomly; setting of a return variation amount in the return control as an amount that is varied randomly; random changing of a timing for carrying out the variation control; and random changing of the frequency of the variation control, and return the control amount to a previous value when the energy consumption has increased or has not decreased as a result of the change in the control amount, and, when the judgment is that the predetermined condition is not met after the variation control, at least a part of the control portions causes the observation information to approach the target information by carrying out return control so that the predetermined condition is met.

(5) The control system according to any of (1) to (4), wherein at least one of the selection of the control portions that increase/decrease the control amount, the magnitude of the increase/decrease of the control amount, and the frequency of the increase/decrease of the control amount is changed.

(6) The control system according to any of (1) to (5), wherein when there is a single comparison portion in the control system, the judgment portion judges that the predetermined condition is met when the observation information is in a constant relation with the target information and judges that the predetermined condition is not met when the observation information is not in a constant relation with the target information, and, when there are at least two comparison portions, the control portions judge that the predetermined condition is met when the observation information are all in a constant relation with the corresponding target information and judges that the predetermined condition is not met when even one is not in a constant relation, and wherein the constant relation is a relation in which the observation information is larger than the corresponding target information.

(7) The control system according to any of (3) to (4), wherein, when the control values of all the control portions are set to their respective maximum values or the predetermined condition is not met, before selection of the control portions, the respective control values of all the control portions are changed in a direction of variation in the return control so that the predetermined condition is met.

(8) The control system according to any of (3) to (4), wherein all the plurality of control portions carry out the return control.

(9) The control system according to any of (3) to (4), wherein the return variation amount in the return control is a return variation amount by which a state before the previous variation control is restored, or an arbitrary variation amount that is returned to a direction reverse to a direction of control in the previous variation control so that the predetermined condition is met.

(10) The control system according to any of (1) to (9), wherein the observation information is caused to approach the target information by applying at least one of a sending method in which, when the comparison result is expressed as two values, the comparison portion sends to the judgment portion only one state of the two values as the comparison result and a sending method in which the judgment portion sends to the control portions only one judgment result that the predetermined condition is met or not met.

(11) The control system according to any of (1) to (10), wherein the judgment portion is provided corresponding to each of the plurality of control portions.

(12) The control system according to any of (3) to (4), wherein at least one of the predetermined variation amount and the return variation amount is a variation amount based on a difference between the observation information and the target information.

(13) The control system according to any of (3) to (4), wherein at least one of the predetermined variation amount and the variation amount in the return control is set for each of the control portions.

(14) The control system according to any of (3) to (4), wherein at least one of the predetermined variation amount and the return variation amount is reduced in response to a convergence in which the observation information approaches the target information, or reduced along with a passing of time until the convergence.

(15) The control system according to any of (1) to (14), wherein the number of control portions selected from the control portions to increase/decrease the control amount is caused to approach one in response to a convergence in which the observation information approaches the target information.

(16) The control system according to any of (3) to (4), wherein at least one of the control value in the variation control and the control value in the return control is varied continuously.

(17) The control system according to any of (1) to (16), wherein at least one of the control value of the plurality of control portions, the observation information and the target information is output to a display.

(18) The control system according to any of (1) to (17), wherein control values of the control portions at a final stage of the convergence can be stored, and the control values of the control portions can be reproduced by receiving an instruction.

(19) The control system according to any of (1) to (18), wherein a plurality of the comparison portions are provided, and at least one partial judgment portion that obtains a comparison result from a part of the comparison portions to carry out a judgment is provided, the partial judgment portion carries out the judgment as a partial judgment for the obtained comparison result, and, when there is any comparison portion that is not judged by the partial judgment portion, the judgment portions adds a comparison result of that comparison portion to the partial judgment result of the partial judgment portion, and carries out the judgment based on the partial judgment result of the partial judgment portion, when there is no comparison portion that is not judged by the partial judgment portion.

(20) The control system according to any of (1) to (19), wherein at lest one of transmission in which the comparison portion sends the comparison result to the judgment portion, transmission in which the partial judgment portion sends the partial judgment result to the judgment portion, and transmission in which the judgment portion sends the judgment result to the control portions is wireless transmission.

(21) The control system according to any of (1) to (20), the control system being used for lighting control, wherein the control portions are lighting devices, the comparison portion is an illumination comparing device, the judgment portion is a judging device, the control value is a light intensity of light sources of the lighting devices, the observation information is sampled illumination at an observation position, and the target information is a target illumination.

(22) A light source constituting the control system according to (21).

(23) A lighting device constituting the control system according to (21).

(24) An illumination comparing device constituting the control system according to (21).

(25) A judgment device constituting the control system according to (21).

With the above-described control systems, it is possible to control an observation amount in a predetermined position, such as an illumination, to a desired value. Furthermore, it is possible to control the amount to a condition in which energy consumption is low.

BEST MODE FOR CARRYING OUT THE INVENTION

Figure 1:
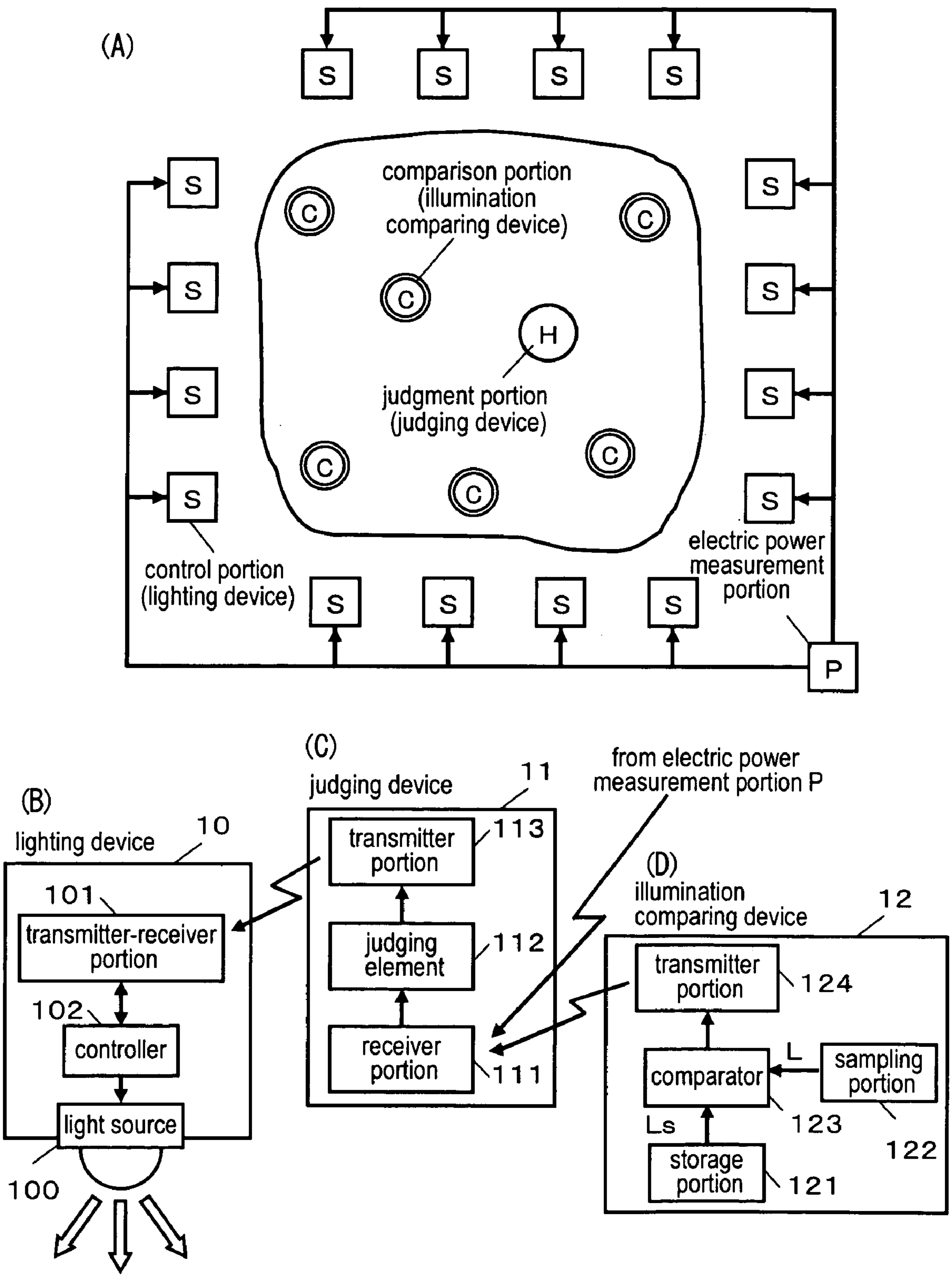
FIG. 1 is a block diagram of one embodiment of a control system according to the present invention.

A control system according to the present invention includes an energy measurement portion, a plurality of control portions, at least one comparison portion, and at least one judgment portion, wherein the energy measurement portion sends to the judgment portion energy information relating to energy consumed by the control portions, the comparison portion sends to the judgment portion a comparison result in which observation information of an arbitrary position and target information are compared, the judgment portion carries out a judgment as to whether a predetermined condition is met, based on the energy information and the comparison result, and sends a result of the judgment to the control portions, and the control portions repetitively increase/decrease a control amount based on the judgment result obtained from the judgment portion, and cause the observation information to approach the target information. When the comparison portion sends the comparison result to the judgment portion, or when the judgment portion sends the judgment result to the control portions, the comparison portion or the judgment portion may specify a destination, but it may send the result without specifying a destination. One of the selection of the control portions that increase/decrease the control amount, the magnitude of the increase/decrease of the control amount, and the frequency of the increase/decrease of the control amount is changed in each increase/decrease control, or at an appropriate opportunity in each increase/decrease processing.

In general, electric power is used as the above-mentioned energy. In this case, the energy measurement portion becomes an electric power measurement portion, the energy information becomes electric power information relating to power consumption, such as the amount or the increase/decrease of power consumption. Energy other than electric power, such as an oil fuel, a gas fuel or air pressure may also be used.

Embodiments of the control system according to the present invention are described below with reference to the accompanying drawings. It should be noted that in the case where structural elements to which identical reference numerals are attached in the embodiments carry out identical operations, duplicate description may be omitted.

EMBODIMENT 1

FIG. 1 is a diagram showing a control system according to the present invention. In FIG. 1, a plurality of control portions S, at least one comparison portion C and at least one judgment portion H are provided. An electric power measurement portion P is also provided. The electric power measurement portion P measures the amount of electric power supplied to the control portions S, and sends to the judgment portion H electric power information expressing the amount of electric power or the increase/decrease of electric power. The comparison portion C is provided with a sampling portion that samples observation information and a storage portion that has target information, and sends to the judgment portion H a comparison result in which the observation information and the target information are compared. The judgment portion H carries out a predetermined judgment, i.e., a judgment as to whether a predetermined condition is met, based on the electric power information and the comparison result, and sends a result of the judgment to the control portions S. The observation information is information indicating an observation result. The target information is information indicating a target value.

The control portions S are capable of carrying out variation control in which the control value is changed from a current control value by a predetermined variation amount and a first return control in which the control value is returned to a direction reverse to the variation control, based on the judgment result. In the control portions S, the larger the control value is, the larger the electric power consumption value is.

The surrounding conditions change based on the control values controlled by the plurality of control portions S, and observation information is generated.

The control portions may also carry out a second return control in which the control value is increased by a predetermined value. That is to say, the return variation amount in the return control may be a return variation amount by which a state before the previous variation control is restored, or an arbitrary variation amount returned to a reverse direction to a direction of control in the previous variation control so that the predetermined condition is met. Here, "reverse direction" means a direction reverse to the overall variation control carried out by the plurality of lighting devices, for example, to the average value. Typically, it is a direction in which the control value is increased, and in which the amount of energy consumption increases.

The present embodiment is described in detail below as a control system for lighting control.

In FIG. 1(A), sixteen lighting devices 10 serving as the control portions S are arranged in a room. As shown in FIG. 1(B), each of the lighting devices 10 is provided with a transmitter-receiver portion 101, a controller 102, and a light source 100. The light sources illuminate the interior of the room, thus determining illuminations at various positions in the room. In FIG. 1(A), the comparison portions C, i.e., illumination comparing devices 12 are arranged at desired positions in the room. As shown in FIG. 1(D), each of the illumination comparing devices 12 is provided with a storage portion 121 that has target illumination information Ls, which is target information, a sampling portion 122 that samples sampled illumination information L, which is observation information, a comparator 123 that compares the target illumination Ls and the sampled illumination L, and a transmitter portion 124 that transmits a result of the comparison. In FIG. 1(A), the judgment portion H, i.e., a judging device 11 is arranged at a desired position in the room. The judging device 11 includes a receiver portion 111, a judging element 112 and a transmitter portion 113, as shown in FIG. 1(C).

In FIG. 1(A), the electric power measurement portion P has the function of measuring the amount of electric power consumed by the plurality of lighting devices S and of transmitting to the judging device 11 electric power information expressing the value of the electric power or the increase/decrease of the value of the electric power.

Each of the illumination comparing devices 12 compares a sampled illumination L sampled by the sampling portion 122, which is a sensor that detects an illumination at a desired position, with a target illumination Ls, and sends a result of the comparison from the transmitter portion 124 to the receiver portion 111.

In the judging device 11, based on the electric power information from the electric power measurement portion P and the comparison results from the illumination comparing devices 12 that have been received at the receiver portion 111, a predetermined judgment as described below is carried out in the judging element 112, and a result of the judgment is transmitted from the transmitter portion 113 to the transmitter-receiver portions 101 of the lighting devices 10.

Based on the judgment result received at the transmitter-receiver portions 101, the lighting devices 10 carry out the operation of any one of variation control in which the light intensity is changed in accordance with a predetermined variation amount, return control in which the light intensity is returned, and retention of light intensity.

Here, the predetermined judgment is carried out when a plurality of the illumination comparing devices are provided as shown in FIG. 1(A), as to whether sampled illuminations sampled by the sampling portions are in a constant relation with the corresponding target illuminations with respect to all the comparison results. The predetermined condition is considered met when these are in a constant relation with respect to all the comparison results, and the predetermined condition is considered not to be met when even one is not in a constant relation. The aforementioned "in a constant relation" refers to when the sampled illuminations are larger than the corresponding target illuminations, and the aforementioned "not in a constant relation" refers to when the sampled illumination is smaller than the corresponding target illumination in any one of the comparison results.

When a single illumination comparing device is provided, the aforementioned "in a constant relation" refers to when the sampled illumination is larger than the corresponding target illumination, and the aforementioned "not in a constant relation" refers to when the sampled illumination is smaller than the corresponding target illumination.

The predetermined variation amount is a variation amount in light intensity of the light sources that is not too large.

Next, a method is described in which the lighting devices cause the illumination to approach a target illumination while repeatedly increasing/decreasing the light intensities. First, the light intensities of the lighting devices are set to either a maximum light intensity or a high light intensity. Next, the plurality of lighting devices respectively carry out variation control separately in parallel. The variation amount for variation control is changed randomly for each of the lighting devices. When the judging device 11 judges that the aforementioned predetermined condition is not met, based on the comparison results from the illumination comparing devices and a partial judgment result from a partial judgment portion, the comparison results are received at the lighting devices, and then all the lighting devices respectively carry out return control to the light intensity prior to the current light variation control. After one time of the return control, usually a return is made to the predetermined condition being met, but when this return does not occur, return control is again carried out until a return is made to the predetermined condition being met.

Further, also when the electric power consumption has not decreased in the electric power information of electric power measurement portion P, all the lighting devices respectively carry out return control to the light intensity prior to the current variation control. While the cases where the electric power consumption has not increased include cases where the electric power consumption has not changed, they may only include cases where the electric power consumption has increased.

Next, variation control is again carried out with a random variation amount. With such judgment and control, the light intensity of the lighting devices as a whole is lowered by the first return control, so that the light intensity is reduced mainly for those lighting devices whose light intensities are too high. When there is any lighting device whose light intensity has been lowered too much by the variation control, the light intensity is returned to increase by the return control, and the light intensity is then lowered again. Eventually, the sampled illumination can be caused to approach the target illumination, while selecting conditions in which electric power consumption is small.

The aforementioned "random" includes cases such as the following. Namely, the lighting devices may carry out variation control such that the light intensity, which is a control value, is arbitrarily increased/decreased. In this case, the light intensities of the light sources may temporarily change to a reverse direction. In other words, the variation amount used may be any of a positive, negative, or zero value.

The above-described random control may be carried out as follows. Namely, the lighting devices may carry out variation control such that while the light intensity, which is a control value, is arbitrarily increased/decreased, on average there is light reduction in one direction. In this case, the light intensities of the light sources may temporarily change to a reverse direction. In other words, the variation amount used may be any of a positive, negative, or zero value.

Furthermore, it is also possible to arbitrarily change the size of the variation amount in variation control without changing the direction thereof. In other words, the variation amount may be either one of zero or a negative value. In this case, the light intensities change in one direction except when there is return control. A reduction in light intensity may be large, small or zero.

When the light intensities are set to minimum at the beginning, the lighting devices may arbitrarily increase/decrease the light intensities, or may carry out light variation control such that while the intensities are arbitrarily increased/decreased, on average there are light increases in one direction. The light intensities of the light sources may temporarily change to the reverse direction. In other words, the variation amount used may be any of a positive, negative, or zero value. Furthermore, it is also possible to arbitrarily change the size of the variation amount in variation control without changing the direction thereof. In other words, the variation amount may be either one of zero or a positive value. In this case, the light intensities change in one direction except when there is return control.

Figure 4:
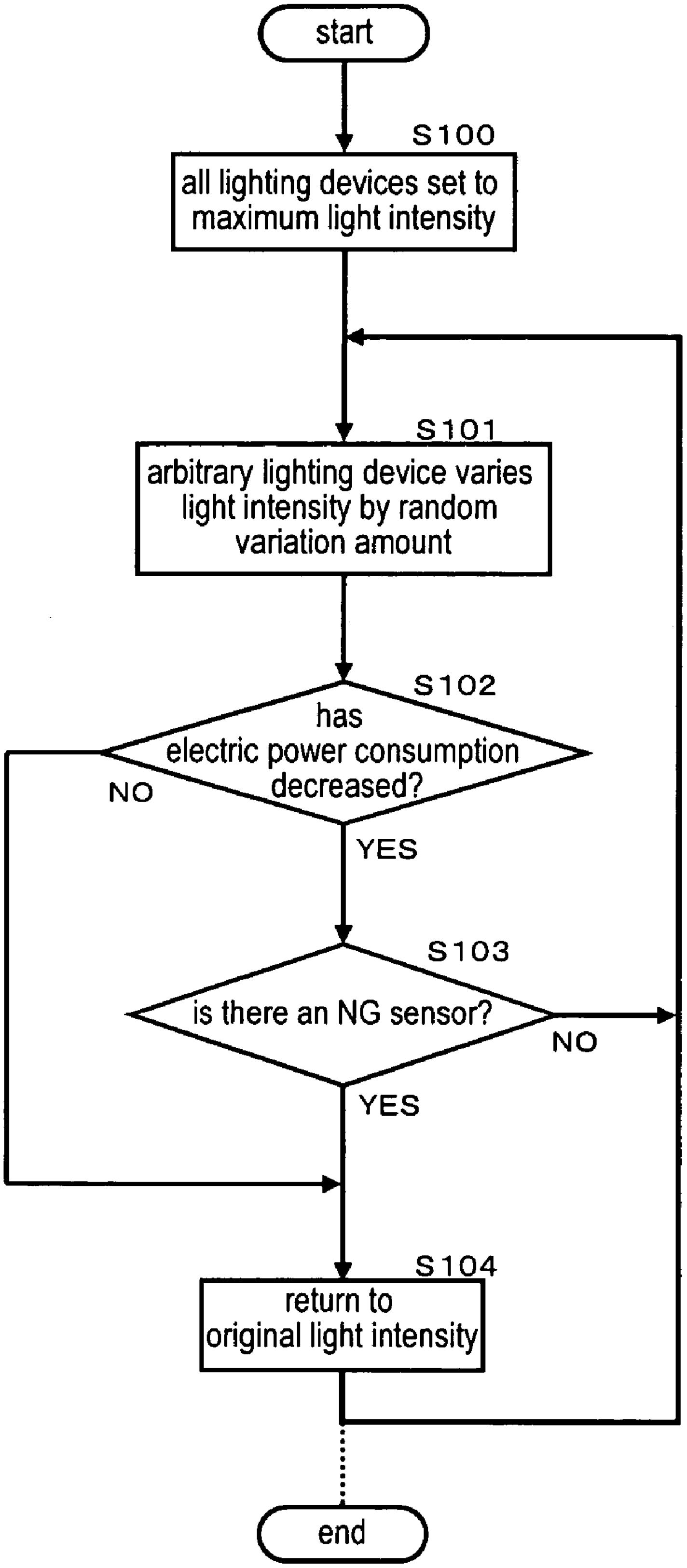
FIG. 4 is a flowchart of one embodiment of a lighting control procedure of a control system according to the present invention.

FIG. 4 is an example of a flowchart of a control procedure according to this embodiment. At (S100), all the lighting devices are set to a maximum light intensity. The procedure then advances to (S101), at which an arbitrary lighting device changes its light intensity by a random variation amount. The procedure then advances to (S102), at which a judgment is carried out as to whether or not the electric power consumption has decreased. If the result is "YES", then the procedure advances to (S103), at which the judging device judges whether there is an NG sensor. If the result is "NO", then the procedure returns to (S101). If the result is "YES" at (S103), then the procedure advances to (S104), at which the lighting devices are returned to the previous light intensity, and the procedure advances to (S101). If the result is "NO" at (S102), then the procedure advances to (S104), at which the lighting devices are returned to the previous light intensity, and the procedure advances to (S101). Although the lighting devices as a whole produce various combinations of light intensities at (S101), those combinations that cause an increase in electric power consumption are eliminated at (S102) and (S104), and only those combinations of light intensities that let the sampled illumination approach the target illumination will remain in a loop of (S102), (S103) and (S101) in the process at which the electric power consumption decreases.

When the lighting devices individually carry out random variation control as described above, the lighting devices do not need to communicate with each other, so that the transmitter-receiver portion 101 may have only reception functionality.

EMBODIMENT 2

Figure 2:
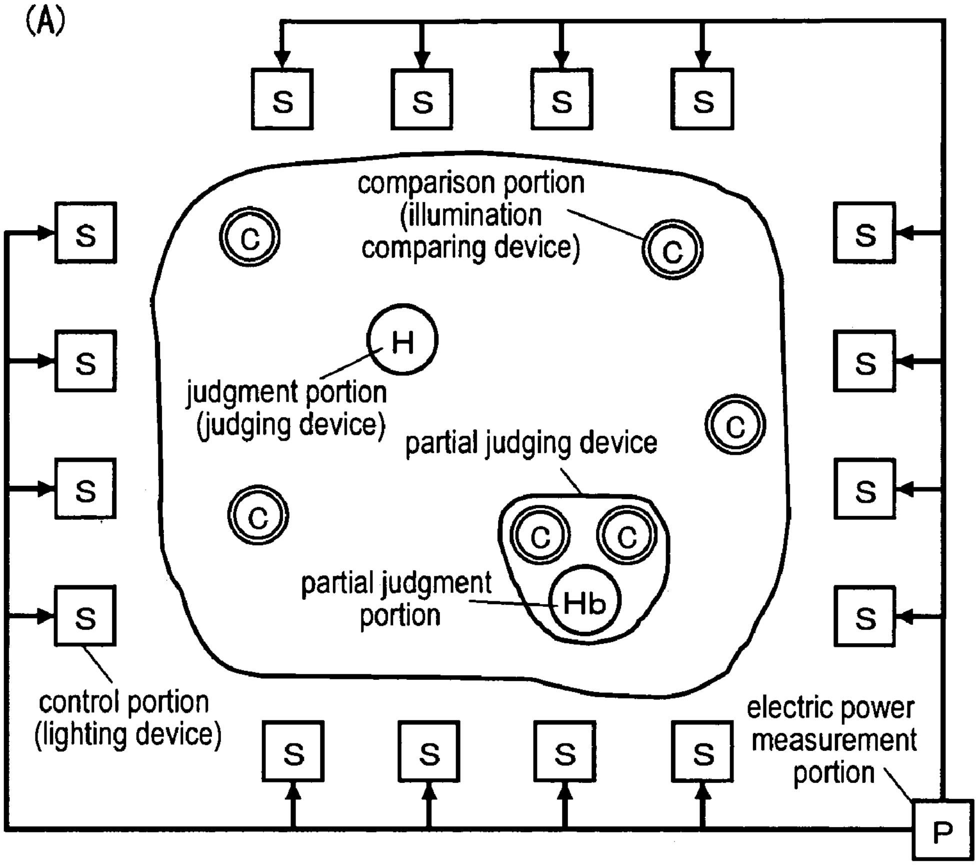
FIG. 2 is a block diagram of one embodiment of a control system according to the present invention.
Figure 2:
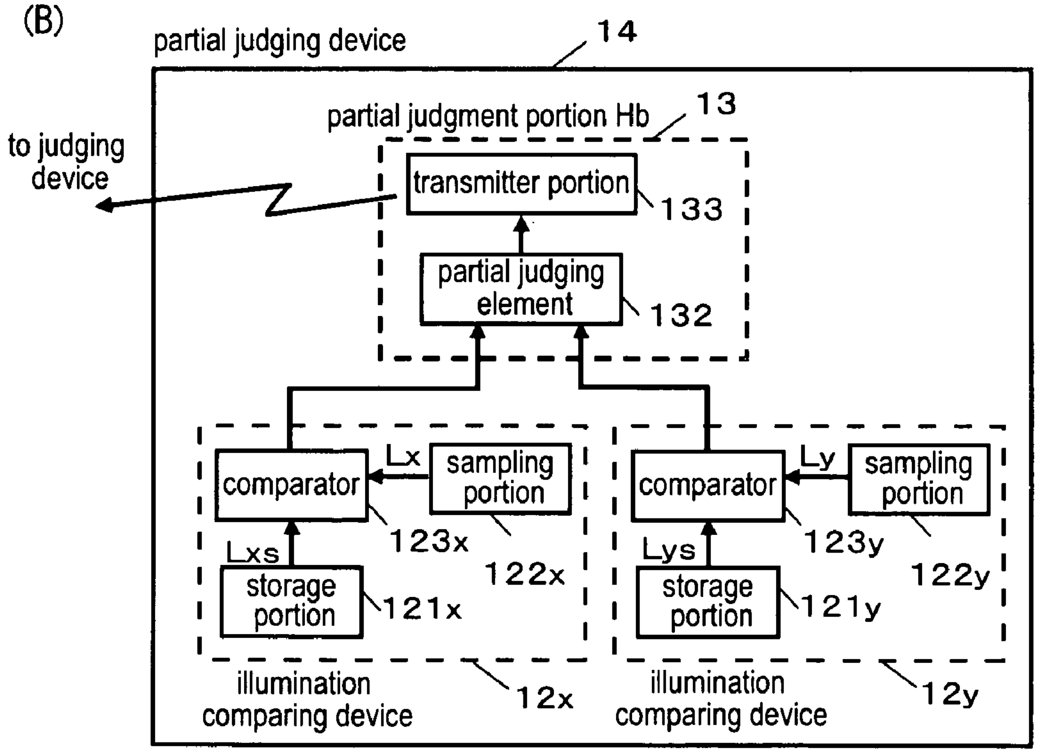

FIG. 2(A) is a diagram of another embodiment of the present invention, wherein a partial judgment portion Hb is introduced. In FIG. 2(A), two comparison portions C and the partial judgment portion Hb constitute a partial judging device. FIG. 2(B) is a block diagram showing a configuration of a partial judging device 14. An illumination comparing device 12*x* is provided with a storage portion 121*x*, a sampling portion 122*x* and a comparator 123*x*, and sends a comparison result between a target illumination Lxs and a sampled illumination Lx to a partial judging element 132 of a partial judgment portion 13. An illumination comparing device 12*y* is provided with a storage portion 121*y*, a sampling portion 122*y* and a comparator 123*y*, and sends a comparison result between a target illumination Lys and a sampled illumination Ly to the partial judging element 132. The partial judging element 132 carries out the above-described predetermined judgment for the comparison results from the two illumination comparing devices 12*x* and 12*y*, and sends a partial judgment result from a transmitter portion 133 to the receiver portion 111 of the judging device 11. The judging element 112 collects the partial judgment result and the rest of the comparison results, and carries out the predetermined judgment. When the partial comparison result does not satisfy a predetermined condition or when even one of the rest of the comparison results is not in a constant relation, the entirety thereof is not in a constant relation as a whole.

Accordingly, a similar judgment result can be obtained either by introducing the partial judging device 14 to partially judge some of the comparison results and carrying out the general judgment by the judgment portion H, as shown in FIG. 2(A), or by directly judging all the comparison results by the judgment portion H, as shown in FIG. 1(A).

The operation of the judgment portion H and the variation control and return control of the lighting devices 10 serving as the control portions S based on the comparison results and the electric power information are carried out as illustrated in FIG. 4, as with Embodiment 1.

When multiple illumination comparing devices 12 are provided at arbitrary positions in a room, they may be provided in a form as shown in FIG. 1(A). On the other hand, when a desired illumination directivity distribution needs to be achieved at a given position, it is possible to achieve desired directive characteristics of illumination by imparting directivity to the two sampling portions 122*x* and 122*y*. In this case, it is useful that a partial judging device 14 including the illumination comparing devices 12*x* and 12*y* integrated therewith is placed at a desired position in a room. Three or more illumination comparing devices 12 may also be integrated.

The procedure of the flowchart described with reference to FIG. 4 can also be applied in this embodiment.

EMBODIMENT 3

Figure 3:
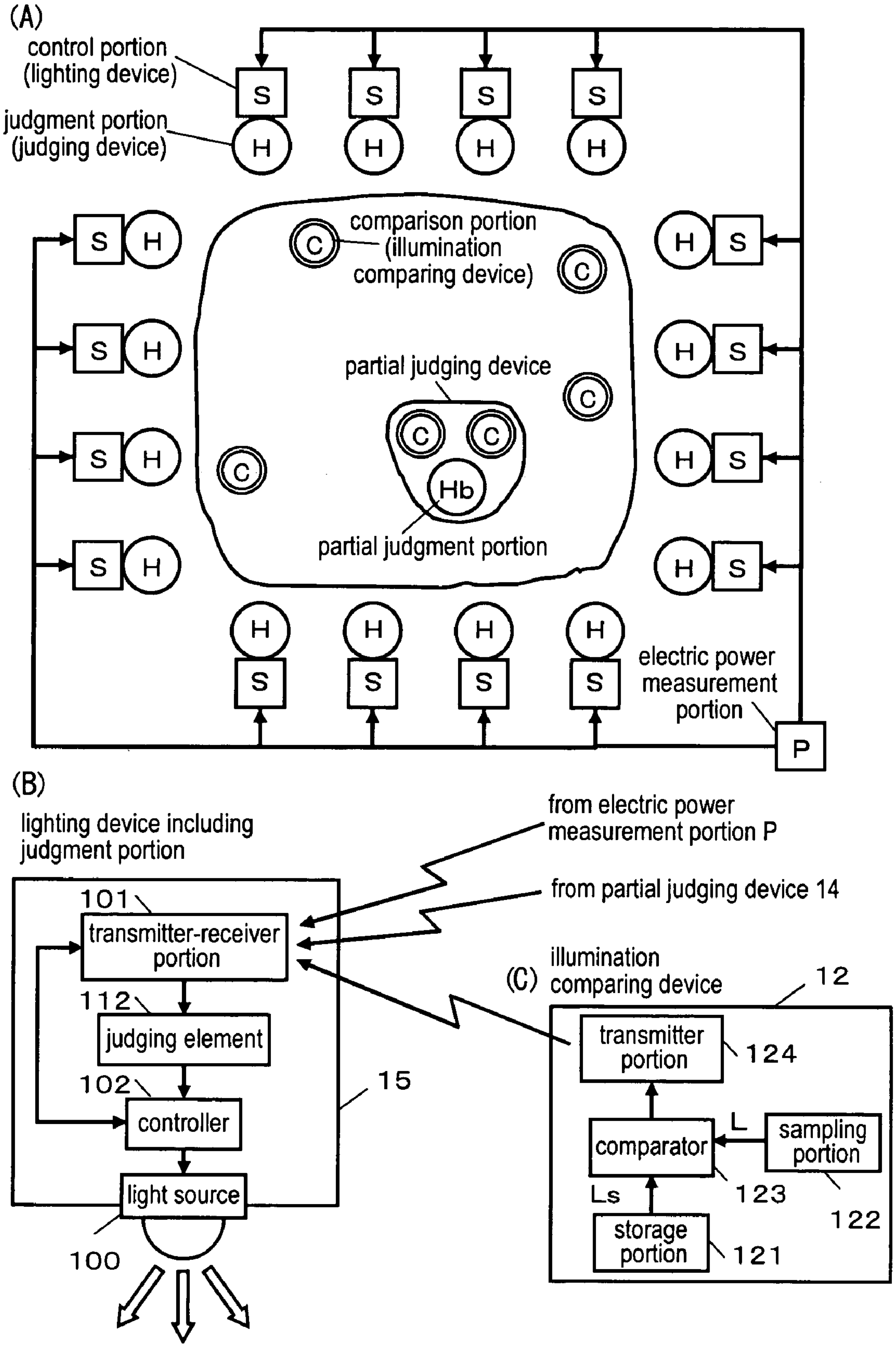
FIG. 3 is a block diagram of one embodiment of a control system according to the present invention.

FIG. 3(A) shows an example in which the judgment portion H is provided to each of the control portions S, which are lighting devices. FIG. 3(B) shows a lighting device 15 that includes a judging element 112, which is an equivalent of the judgment portion H. The lighting device 15 receives the comparison results, the partial judgment result and the electric power information from the transmitter-receiver portion 101, and carries out the predetermined judgment in the judging element 112. In accordance with the judgment result, the controller 102 carries out variation control or return control. The procedure of the flowchart described with reference to FIG. 4 can also be applied in this embodiment.

EMBODIMENT 4

Figure 5:
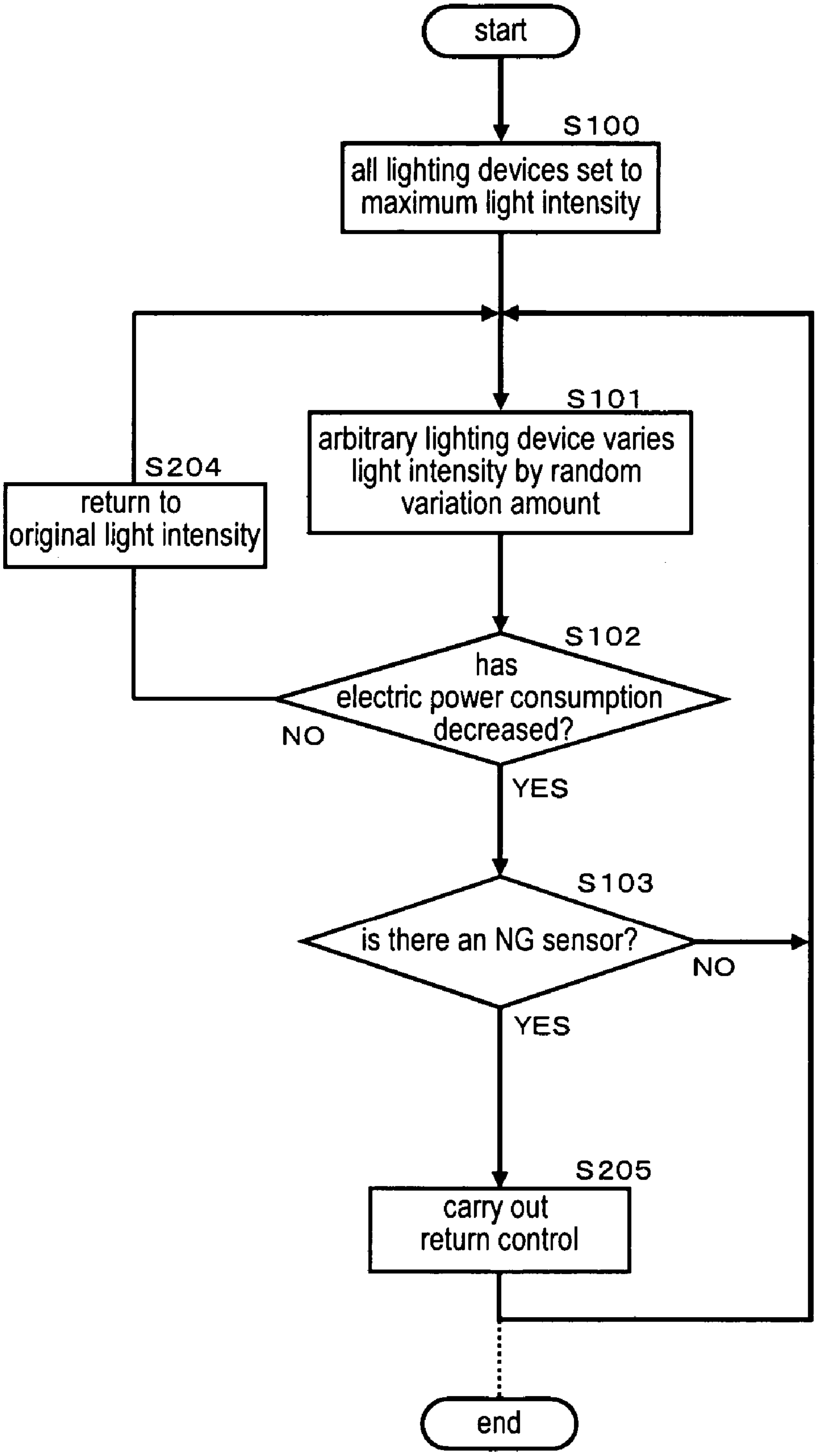
FIG. 5 is a flowchart of one embodiment of a lighting control procedure of a control system according to the present invention.

FIG. 5 shows another example of a flowchart of a control procedure according to this embodiment. The processes in this flowchart can also be applied in the control systems shown in FIGS. 1, 2 and 3.

At Step (S100) in FIG. 5, all the lighting devices are set to a maximum light intensity. The procedure then advances to (S101), at which an arbitrary lighting device changes its light intensity by a random variation amount. The procedure then advances to (S102), at which a judgment is carried out as to whether or not the electric power consumption has decreased. If the result is "YES", then the procedure advances to (S103), at which the judging device judges whether there is an NG sensor. If the result is "NO" at (S103), then the procedure returns to (S101). If the result is "YES" at (S103), then the procedure advances to (S205), at which the lighting devices carry out return control, and the procedure advances to (S101). In the return control at (S205), the light intensities are increased by a predetermined amount. The amount of light increase is set to a value with which there is no NG sensor. If the result is "NO" at (S102), then the procedure advances to (S204), at which the lighting devices are returned to the previous light intensity, and the procedure advances to (S101). "The previous light intensity" refers to a light intensity prior to the immediately preceding variation control. Although the lighting devices as a whole produce various combinations of light intensities at (S101), those combinations that cause an increase in electric power consumption are eliminated at (S102), and only those combinations of light intensities that let the sampled illumination approach the target illumination will remain in a loop of (S103), (S205) and (S101) in the process at which the electric power consumption decreases. Since the return control at (S205) is carried out by all the lighting devices, the comparison results satisfy the predetermined condition when the amount of return control is above a certain level.

The return control at (S204) can be referred to as a "first return control", and the return control at (S205) can be referred to as a "second return control".

EMBODIMENT 5

Figure 6:
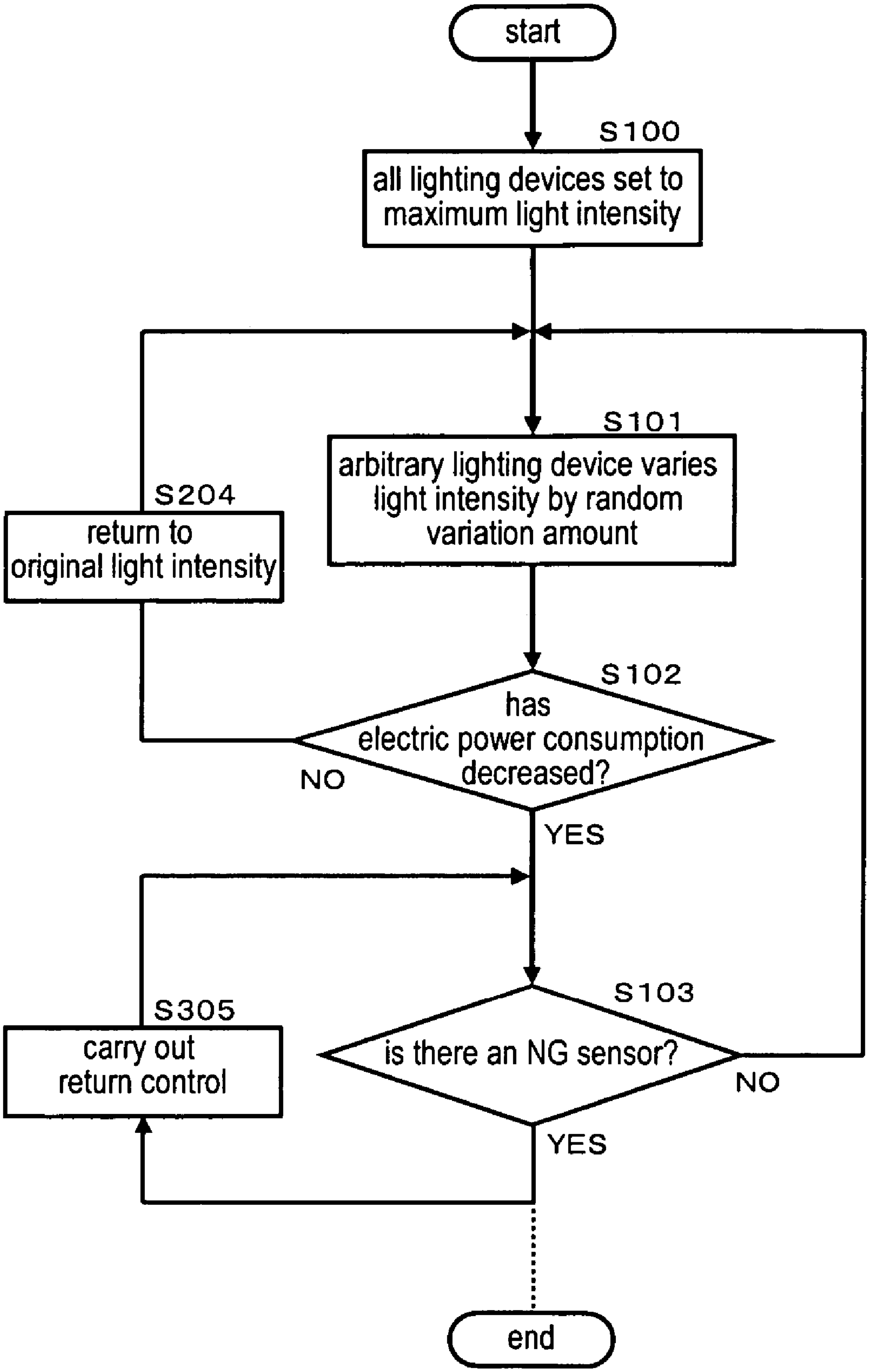
FIG. 6 is a flowchart of one embodiment of a lighting control procedure of a control system according to the present invention.

FIG. 6 is another example of a flowchart of a control procedure according to this embodiment. The processes of this flowchart can be applied to the control systems shown in FIGS. 1, 2 and 3.

At Step (S100) in FIG. 6, all the lighting devices are set to a maximum light intensity. The procedure then advances to (S101), at which an arbitrary lighting device changes its light intensity by a random variation amount. The procedure then advances to (S102), at which a judgment is carried out as to whether or not the electric power consumption has decreased. If the result is "YES", then the procedure advances to (S103), at which the judging device judges whether there is an NG sensor. If the result is "NO" at (S103), then the procedure returns to (S101). If the result is "YES" at (S103), then the procedure advances to (S305), at which the lighting devices carry out return control, and the procedure advances to (S103). The return control at (S305) is light increase control. If the result is "NO" at (S102), then the procedure advances to (S204), at which the lighting devices are returned to the previous light intensity, and the procedure advances to (S101). "The previous light intensity" refers to a light intensity prior to the immediately preceding variation control. Although the lighting devices as a whole produce various combinations of light intensities at (S101), those combinations that cause an increase in electric power consumption are eliminated at (S102), and only those combinations of light intensities that let the sampled illumination approach the target illumination will remain in a loop of (S103), (S305) and (S101) in the process at which the electric power consumption decreases. Since the return control at (S305) is carried out by all the lighting devices, the comparison results satisfy the predetermined condition when the amount of return control is above a certain level. Even if the amount of return control is insufficient, return control can be carried out until the result is "NO" at (S103) by repeating (S305), so that it is always possible to return from (S103) to (S101). In case of any malfunctions or breakdowns of some of the lighting devices, the amount of return control could also be insufficient. In such a case, however, it is also possible to continue illumination control.

The return control at (S204) can be referred to as a "first return control", and the return control at (S305) can be referred to as a "second return control".

EMBODIMENT 6

Figure 7:
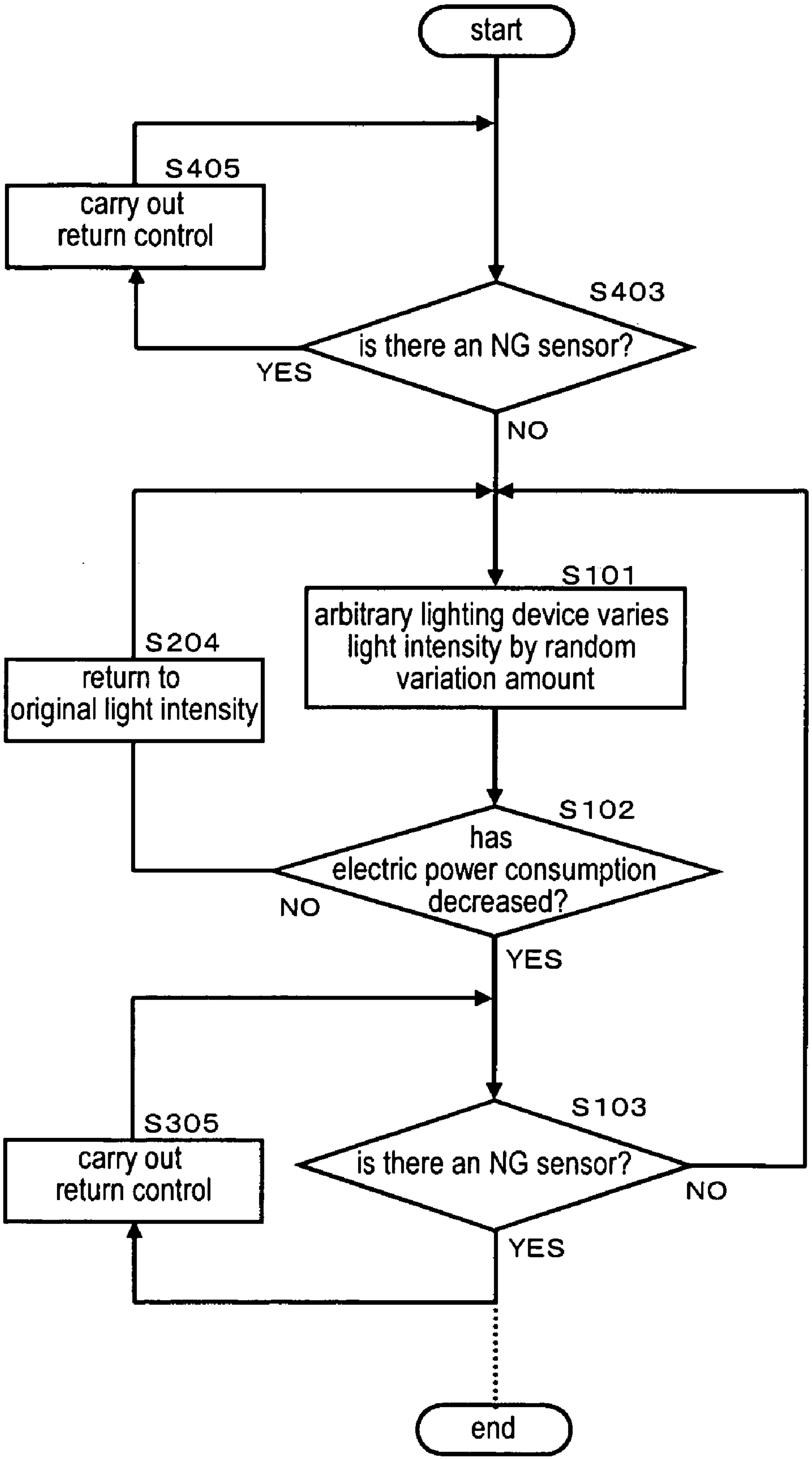
FIG. 7 is a flowchart of one embodiment of a lighting control procedure of a control system according to the present invention.

FIG. 7 shows another example of a flowchart of a control procedure according to this embodiment. The processes of this flowchart can be applied in the control system shown in FIGS. 1, 2 and 3.

First, the light intensities of all the lighting devices are set appropriately. At (S403), a judgment is carried out as to whether or not the comparison results satisfy the predetermined condition. If the result is "YES" at (S403), then the procedure advances to (S405), at which light increase control is conducted as return control, and the procedure returns to (S403). With this procedure, all the comparison results satisfy the predetermined condition, that is, all the sampled illuminations are larger than the target illuminations. After this state has been achieved, the procedure continues to the next process of lowering any excessive light intensities.

The procedure advances to (S101), at which an arbitrary lighting device changes its light intensity by a random variation amount. The procedure then advances to (S102), at which a judgment is carried out as to whether or not the electric power consumption has decreased. If the result is "YES", then the procedure advances to (S103), at which the judging device judges whether there is an NG sensor. If the result is "NO" at (S103), then the procedure returns to (S101). If the result is "YES" at (S103), then the procedure advances to (S305), at which the lighting devices carry out return control, and the procedure advances to (S103). The return control at (S305) is light increase control. If the result is "NO" at (S102), then the procedure advances to (S204), at which the lighting devices are returned to the previous light intensity, and the procedure advances to (S101). "The previous light intensity" refers to a light intensity prior to the immediately preceding variation control. Although the lighting devices as a whole produce various combinations of light intensities at (S101), those combinations that cause an increase in electric power consumption are eliminated at (S102), and only those combinations of light intensities that let the sampled illumination approach the target illumination will remain in a loop of (S103), (S305) and (S101) in the process at which the electric power consumption decreases. Since the return control at (S305) is carried out by all the lighting devices, the comparison results satisfy the predetermined condition when the amount of return control is above a certain level. Even if the amount of return control is insufficient, return control can be carried out until the result is “NO” at (S103), so that it is always possible to return from (S103) to (S101). In case of any malfunctions or breakdowns of some of the lighting devices the amount of return control could also be insufficient. In such a case, however, it is also possible to continue illumination control.

The steps of (S403) and (S405) can be used in place of the step (S100) in FIGS. 4 and 5.

EMBODIMENT 7

Figure 8:
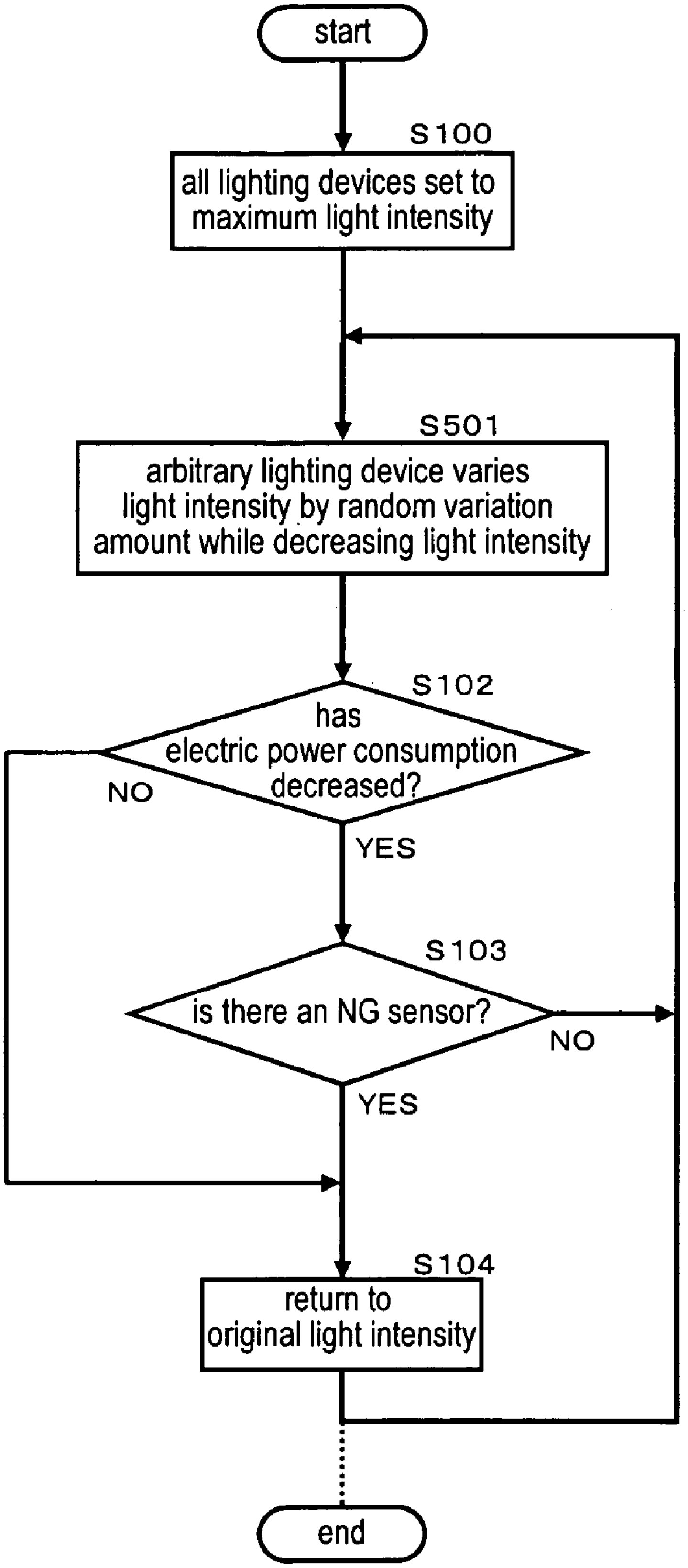
FIG. 8 is a flowchart of one embodiment of a lighting control procedure of a control system according to the present invention.

FIG. 8 is a flowchart for a case in which (S101) is replaced by (S501) in the flowchart described with reference to FIG. 4. At (S501), while an arbitrary lighting device changes its light intensity by a random variation amount, on average there is a decrease in the light intensities of the lighting devices. Variation control is carried out so that although it is possible for the light intensity of a single lighting device to temporarily increase by a random amount, the time-average of the light intensity decreases. Accordingly, there may be a lighting device whose light intensity decreases each time, and wherein the light intensity assumes a random value. Further, the light intensity of the lighting devices as a whole may be varied randomly such that although it is possible for the total value of light intensities to temporarily increase to raise the electric power consumption, broadly the light intensities decrease.

EMBODIMENT 8

In the above-described embodiments, differential illuminations between the sampled illuminations and the target illuminations may be sent from the illumination comparing devices to the judging device 11, the average value of the differential illuminations may be sent to the lighting devices, and the lighting devices may decrease the value of the above-described randomly changed variation amount in response to a decrease in the received average differential illumination. The amount of light intensity returned in return control may be decreased in response to a decrease in the differential illuminations. By doing this, constriction to the target illumination can be achieved rapidly and flickering of the illumination in a constricted state can be made smaller.

The amount of light intensity returned in the above-described second return control may be changed randomly. Since there are times when the aforementioned predetermined condition cannot be met in one time, the return control is carried out until there is a return to a state in which the predetermined condition is met, as described with reference to the flowchart of FIG. 6. Differential illuminations between the sampled illuminations and the target illuminations may be sent from the illumination comparing devices to the judging device 11, the average value of the differential illuminations may be sent to all the lighting devices, and the lighting devices may decrease the amount of light intensity returned in response to a decrease in the received average differential illumination.

The time intervals with which the lighting devices carry out variation control, that is, the timing for the next variation control may be randomly changed. A lighting device in which variation control continues with short time intervals carries out variation control with high frequency, and thus makes a contribution to the illumination similar to a lighting device with a large variation amount.

When variation control is carried out with random timing, there are less chances for the plurality of lighting devices to simultaneously change the light intensities, so that it is possible to reduce a significant change in the light intensities, thus decreasing flickering in the illumination.

EMBODIMENT 9

In the above-described embodiments, the lighting devices individually carry out random variation control. However, any of the lighting devices may be selected to carry out random variation control. Further, any of the lighting devices may also be selected to carry out return control. Methods for selecting a lighting device that carries out variation control and return control, which is light increase control, are described. When a central device manages the plurality of lighting devices, the central device can select the lighting device and therefore there is no need for negotiation among the lighting devices. However, it is necessary to manage the addresses for distinguishing the lighting devices, which is somewhat complicated. In a method in which individual lighting devices decide whether to carry out variation control and return control through negotiation among the lighting devices, there is no need to manage the communications.

First, a method in which there is no need for negotiation among the lighting device is described.

When control is commenced, the controller 102 of each of the lighting devices generates a random number internally, and carries out variation control when the random number is at most a threshold value β1. When the random number is a random number of uniform distribution that is an integer from 0 to 255, and β1 is 15, the lighting devices carry out variation control with a probability of 1/16. That is, about one one-sixteenth of all the lighting devices carries out variation control, on average. The rest of the lighting devices are on standby, with their light intensities being maintained. In the next variation control, the lighting devices that carried out the previous variation control generate a random number, and carry out variation control when the random number is at most a threshold value β2=8. The lighting devices that did not carry out the previous variation control similarly generate a random number, and carry out variation control when the random number is at most a threshold value β3=15. In return control, the lighting devices that has carried out variation control generate a random number, and carry out return control when the random number is at most a threshold value β4=127. The lighting devices that have not carried out variation control similarly generate a random number, and carry out return control when the random number is at most a threshold value β5=63. The random number is generated each time the controller 102 receives a judgment result. From the judgment result, it is possible to know whether the next control will be either variation control or return control. By doing this, from a broad view, the sampled illumination approaches the target illumination, while one or a plurality of lighting devices, which are determined stochastically, carry out variation control and return control autonomously. The threshold values β3 and β5 may be set larger for those lighting devices that have not carried out variation control or return control for a while. The threshold values β2 and β4 may be set smaller for those lighting devices that carry out variation control or return control frequently. The values of the threshold values β1, β2, β3, β4 and β5, and the size of the random number may be different from the examples given above.

The timing for starting to generate the random number may be when the lighting devices have received a judgment result that is regularly transmitted by the judging device 11. The timing for synchronization of the lighting devices is when the judgment result is transmitted. Since there is no need for negotiation among the lighting devices, the transmitter-receiver portion 101 may have only reception functionality.

The judging device 11 may transmit the judgment result only when the predetermined condition is not met, and may not transmit the judgment result when it is met. The lighting devices start to generate a random number for return control at a time when this judgment result has been received. When no judgment result has been received for a certain period of time thereafter, they start to generate a random number for variation control. The timing for variation control may or may not be synchronized.

When there are a plurality of illumination comparing devices 12, the judging device 11 has to receive a plurality of comparison results. The illumination comparing devices 12 may use varied transmission frequencies so that no interference will occur. Their transmission timings may be shifted from each other. When the comparison results between the target illuminations and the sampled illuminations transmitted by the illumination comparing devices 12 consist only of two kinds, namely, target illumination>sampled illumination, or target illumination≦sampled illumination, and do not include a differential illumination value as described below, the judging device 11 can judge whether or not the above-described predetermined condition is met by detecting the received frequency, if the transmit frequency for the cases where target illumination>sampled illumination and that for the cases where target illumination≦sampled illumination are different. In the case of variation control as light reduction control, the judging device 11 can judge that the predetermined condition is met when it does not receive a predetermined frequency, if only the illumination comparing device 12 in which target illumination>sampled illumination is set to make transmission at the predetermined frequency. On the other hand, the judging device 11 can judge that the predetermined condition is not met when it receives the predetermined frequency. Consequently, transmission/reception and judgment are simplified. Even if a plurality of the illumination comparing devices make transmission simultaneously, the judging device 11 can receive comparison results from these illumination comparing devices unless they completely cancel each other. In order to reduce the risk of cancellation due to carrier frequencies in completely opposite phases, a weak, random modulation may be applied to achieve spectral diffusion.

In the case of such a simple transmission/reception method, the transmitter-receiver portions 101 of the lighting devices may directly receive transmission signals from the illumination comparing devices 12, and, when a predetermined frequency is received, it may judge that the predetermined condition is not met and start return control. That is, this can be considered to be either a configuration in which the judging device 11 is unnecessary, or a configuration in which the judging device 11 is attached to each of the lighting devices. In other words, this is the configuration described in Embodiment 3.

The illumination comparing devices 12 may transmit a comparison result with a certain time interval, instead of transmitting it constantly. This can reduce the electric power consumption for transmission. When the illumination comparing devices 12 are not synchronized, there may be cases where their transmission timings are shifted from one another. In such a case, when a comparison result indicating target illumination>sampled illumination is not received within a certain period of time, the judging device 11 may judge that all the comparison results indicate target illumination≦sampled illumination.

When the timing for generating a random number is not obtained from the judging device 11 or the illumination comparing devices 12, the lighting devices may be synchronized to generate a random number. The synchronization can be achieved via a lamp line.

The lighting devices may autonomously carry out variation control by respectively generating a random number with a certain time interval, and may generate a random number for return control when receiving a judgment that the predetermined condition is not met from the judging device 11, or when receiving a signal indicating that target illumination>sampled illumination from any one of the illumination comparing devices 12. In this case, it is not necessary to perform the above-described synchronization.

The above-described method in which the selected lighting devices carry out variation control and return control by generating a random number can also be considered as a method in which the time interval or frequency of performing variation control and return control is randomly changed. In this case, even if the absolute value of the variation amount in light intensity in variation control and return control is set to a non-random value, broadly, it can be considered as the same as the case in which the variation amount is randomly changed.

When the above-described selected lighting devices carry out variation control with random timing with respect to each other, instead of carrying out variation control or return control simultaneously, there are less chances for the plurality of lighting devices to simultaneously change the light intensities, so that it is possible to reduce a significant change in the light intensities, thus decreasing flickering in the illumination.

EMBODIMENT 10

Next, the method for selecting the lighting devices through negotiation is described. Negotiation of communications and processing among the lighting devices is carried out as follows. The lighting devices carry out variation control and return control, using a first-come-first-served system. In order to do this, when control is commenced or when a lighting device receives a notification of completion of processing from another lighting device, it transmits a control declaration indicating that it carries out control, after a delay time Td from reception. Td is decided using a random number that is generated inside each of the lighting devices. Then, a lighting device transmits control prohibition information when it receives (n−1) control declarations from another lighting device. The lighting device that has received the control prohibition information will not transmit a control declaration, and goes into standby without carrying out control.

A lighting device k, which had a smallest delay time Td, transmits its control declaration, and then transmits control prohibition information for the first time when it first receives (n−1) control declarations from another lighting device. Then, n lighting devices, including the lighting device k, that were able to transmit a control declaration in this period can enter into variation control or return control. When the same random number is generated in many lighting devices, there may be cases where n or more lighting devices have transmitted a control declaration, but the probability of such cases is low.

Such a mechanism is applied when commencing variation control first, when selecting a lighting device to perform the next variation control from lighting devices that has carried out variation control, when selecting a lighting device to perform the next variation control from lighting devices that has not carried out variation control, when selecting a lighting device to perform return control from lighting devices that has carried out variation control, and, when selecting a lighting device to perform return control from lighting devices that has not carried out variation control. The value for n for the selections can be set to values different from each other. The same is true for the return control.

The generation of a random number can be commenced by a timing by which a judgment result is received from the judging device. From the content of a judgment result, the lighting devices can judge whether there is a variation control declaration or a return control declaration. The next variation control or return control is commenced by a timing by which control prohibition information is transmitted and received. After a predetermined time period in which the light intensities of the lighting devices have stabilized has elapsed since the receiver portion 111 of the judging device received the control prohibition information, the judging element 112 carries out the next judgment, and a result of the judgment is transmitted from the transmitter portion 113.

It should be emphasized that the control declaration information and the control prohibition information need to be in forms that can be distinguished from each other. The operation frequencies and encoding patterns may be made different.

When a group of lighting devices that has carried out variation control and a group of lighting devices that has not carried out variation control respectively select a lighting device to perform the next variation control or return control, the two groups may carry out negotiation for the selection simultaneously. In this case, interference can be avoided if the two groups use different frequencies.

Stochastically, there may be a lighting device that cannot carry out variation control or return control for a long time. All the lighting devices can be given the opportunity to carry out variation control and return control with suitable frequency, if each of the lighting devices counts the number of histories on its variation control or return control, and increases the probability of generation of a small value in production of the random number when its frequency of performing control is low.

In the negotiation described above, communications may be broadcast-type communications in which it is not necessary for the devices to specify each other, and do not require a destination address.

EMBODIMENT 11

Next, negotiation of communications and processing among the lighting devices for the case where a single lighting device is selected from the lighting devices at a time is described. The lighting devices carry out a variation control declaration, using a first-come-first-served system. In order to do this, when a lighting device receives a notification of completion of processing from another lighting device, it transmits a variation control declaration after a delay time Td from reception, after which the right of processing of that lighting device is established if a processing declaration is not received from another lighting device within a predetermined window time Tw, and then variation control commences. The delay time Td is decided using a random number inside each of the lighting devices. When a lighting device that has a large delay time Td and has not yet carried out a processing declaration receives a declaration from another lighting device before carrying out its processing declaration, it will not transmit a processing declaration until the next notification of completion of processing is received. It is rare for the value of the delay time Td to be the same in two or more lighting devices. That is, it is extremely rare for a plurality of lighting devices to carry out variation control declarations at the same time and ordinarily only one lighting device acquires the right of processing.

In extremely rare cases, a plurality of lighting devices may carry out declarations substantially simultaneously and receive a declaration of variation control from a different lighting device other than itself within the time Tw. In this case, a judgment is made that there is a different lighting device carrying out a variation control declaration and after a delay time Td' decided by again generating a random number, a variation control declaration is again transmitted. It is even rarer for the delay time Td' to again be the same value in a plurality of lighting devices and finally only one lighting device is able to acquire the right of variation control. Even in the remote possibility that variation control declarations again occur simultaneously, if the declarations are repeated, definitely only one lighting device will be able to acquire the right of variation control. In this process, a lighting device that receives a variation control declaration prior to carrying out a variation control declaration does not acquire the right of variation control and goes into a standby state until the next notification of completion of variation control is received.

The window time Tw can be set longer than a total time required for transmission processing, reception processing, and detection of reception processing of the variation control declaration. The delay times Td and Td' can be set to a time of a random integral multiple of a unit delay time (Tw+$\delta$T) longer than the window time Tw.

The aforementioned variation control declaration works to prohibit variation control in the other lighting devices. As another method, variation control prohibition information may be transmitted after a predetermined time Tf from transmission of the variation control declaration such that a lighting device that receives the variation control prohibition information does not carry out variation control. Tf is set to a value sufficiently smaller than (Tw+$\delta$T).

It should be noted that by arranging a lighting device k, which had the smallest delay time Td, to transmit its variation control declaration and then transmit variation control prohibition information after receiving one variation control declaration from another lighting device, the number of lighting devices that carry out variation control declarations prior to receiving the variation control prohibition information becomes two including the lighting device k, and therefore it is possible to have two lighting devices commence variation control. When the lighting device k receives two or more variation control declarations simultaneously after it has transmitted its variation control declaration, it transmits variation control prohibition information and information to restart variation control declarations, and the aforementioned two or more lighting devices that have already transmitted variation control declarations carry out again variation control declarations, so that the number can be reduced to one. Using the same principle, the number of lighting devices that carry out variation control can be set to a desired number of three or more devices Furthermore, the following is also possible. Namely, it is possible to provide a loop counter memory in each lighting device and to increase by one the number of times of loops stored in the loop counter memory each time processing is executed such that along with variation control declarations, loop count data is sent during the aforementioned negotiation. By arranging so that a lighting device that has received a variation control declaration from another lighting device does not carry out a variation control declaration when its number of times of loops is higher, it is possible to cause the acquisition of the right for variation control to occur giving priority to lighting devices having lower number of times of loops. It is also possible to avoid having only a part of the lighting device carry out variation control numerous times.

Instead of deciding the delay time Td using random numbers, the number of lighting devices to carry out a variation control declaration may be reduced to one by setting in each lighting device a probability P less than one that a variation control declaration can be carried out. Each lighting device generates a random number and carries out a variation control declaration only when the number is in a certain range. When variation control declarations overlap within the window time Tw, those lighting devices again generate a random number and carry out a variation control declaration only when the number is in a certain range. In this way, finally there is one lighting device. It should be noted that it is also possible to cause the probability P to approach one in accordance to increases in the number of times of loops.

In regard to the aforementioned return control, the return control can be carried out when the information of the judgment result sent by the judging device is received by the transmitter-receiver portions 101 of the lighting devices and the control portions 102 may carry out the return control when it is judged that the received content does not satisfy the predetermined condition. Since the information of the judgment results sent by the judging device is received at the same time by all the lighting devices, the return control is carried out together by all the lighting devices including lighting devices that have carried out variation control.

By carrying out negotiation using the same principle as described above between the lighting devices that have not carried out variation control, it is also possible to select the lighting devices to carry out return control. And it is also possible to use negotiation to decide the lighting devices that will not carry out return control.

Regarding the timing for negotiation and the communication information and operation frequencies used for negotiation, the previously described various methods may be applied.

These communications may be broadcast-type communications that do not require a destination lighting device. Accordingly, there are no destination addresses and the mode of communication information can be simplified.

With such a broadcast-type communication system, lighting control can be carried out so that there is predetermined illumination in a predetermined position without adjusting the lighting devices or the illumination comparing devices even when the number of lighting devices increases or decreases and even when the number of illumination comparing devices increases or decreases. It is also possible to freely move the illumination comparing devices to a desired position and then make the illumination of that position constrict or converge to a desired value.

It should be noted that by separately providing a management device that manages all the lighting devices, it is possible to achieve a configuration in which the execution of variation control is instructed and the lighting devices are caused to conduct variation control in order. In this case, the management device and the transmitter-receiver portions of the lighting devices may be connected using wired communication routes or may be connected using wireless channels such as a wireless LAN. By providing plug and play functionality, even when there is an addition to the number of lighting devices, lighting control can be carried out in a state in which a new lighting device has been added.

It is possible that immediately after starting, the lighting devices communicate with each other simultaneously or alternately and are allotted numbers respectively so as to not overlap, then after the allotment of numbers has finished, variation control is carried out in the order of the numbers such that in the event of a notification of variation control, each device notifies its own number and the lighting device of the next number thereafter is set to acquire the right to carry out the next variation control.

EMBODIMENT 12

In the foregoing embodiments, if the light intensity setting values of the light sources and lighting devices converged on the desired illumination distribution are stored, then prior to a performance or the like, the desired illumination distribution can be achieved quickly by reading out the stored setting values and setting the light intensities. Also, by storing the light intensity setting values of the light sources and lighting devices at an arbitrary stage of the convergence process and then reading out the stored setting values and setting the light intensities, the convergence procedure can commence from that stage such that the desired illumination distribution can be reached very rapidly.

EMBODIMENT 13

In the foregoing embodiments, if the light intensity setting values of the light sources and lighting devices in the convergence process toward the desired illumination distribution and the sampled illuminations of the illumination sampling portions are output to a display, the status of the convergence operation can be confirmed. Moreover, if the target illuminations of the illumination sampling portions are output to a display, the progress status until convergence can be grasped.

OTHER EMBODIMENTS AND SUPPLEMENT NOTES

It should be emphasized that in the above-described embodiments if the maximum light intensity of the lighting devices is low, then with the above-described procedure, the target illuminations may not be able to be regulated at the desired illumination. It should also be emphasized that when the number of light sources is small and the number of illumination sampling portions is large, the illumination at all the positions may not be able to be regulated according to the target illuminations. Furthermore, it should be emphasized that when extremely high illuminations or low illuminations are included in a portion of the target illuminations, it may not be possible to regulate at the desired illumination unless the light source is arranged in an appropriate position. In other words, if it is originally possible to achieve an illumination distribution by regulating the light intensities of the light sources, then a desired illumination distribution is achievable using the above-described procedure. Furthermore, even for larger errors with respect to the target illumination, it is possible to approach the target illumination.

Preferably, the above-described control portions S and the lighting devices 10 may each carry out variation control and return control with suitable frequency. However, depending on the method of negotiation or the method of generating random numbers, there could be a control portion S and a lighting device 10 that are never selected to carry out variation control or return control. In the case of carrying out only variation control without performing return control, or in the case of carrying out only return control without performing variation control, the control values or the light intensities will be fixed to a maximum value or a minimum value. Further, when failure occurs in some of the control portions S or the lighting devices 10, there may be cases where the control value and the light intensity may not be changed. Such control portions S and lighting devices 10 may be considered as a kind of the fixed environmental conditions in the control system of the present invention. For example, they may be considered as the same as some of the outside light entering from a window. It should be emphasized that the fact that the observation information is generated in this manner based on the control values or light intensities controlled by a plurality of the control portions S and the lighting devices 10 means that the observation information generated also includes other control values, the outside light, and light intensities of other lighting devices.

Even in such a case, the remaining control portions S or lighting devices 10 carry out control of the control values and the light intensities to compensate for the above-described fixed environmental conditions so that the observation information and the sampled illumination approach desired target information and target illumination as much as possible.

In the above-described embodiments, it is explained that when the selected lighting devices carry out variation control with random timing, rather than carrying it out simultaneously, there are less chances for a plurality of the lighting devices to change the light intensities simultaneously, so that it is possible to reduce a significant change in the light intensities, thus decreasing flickering in the illumination. Similarly, when a single lighting device is selected, if the timing for its variation control is set to random timing, then the illumination will not change frequently, so that it is possible to suppress flickering.

In the above-described various embodiments, the term "random" is used and examples thereof are illustrated. However, "random" is not limited to these illustrated examples. Random light intensities may not be of uniform distribution or normal distribution statistically, and may include a light intensity and a degree of change in light intensity that are varied by each of the lighting devices separately, rather than uniformly among the lighting devices. Further, random changes may include changes occurring in a case where the degree of variations in change temporarily decreases in some of the lighting devices, but such a state is not continued and changes into a state with a different degree of variations. Randomness in timing may also be changed similarly.

In the above-described embodiments, when the comparison result and the judgment result are expressed as binary values (two values), it is possible to transmit both of the binary values expressing the comparison result or the judgment result, but it is also possible to transmit only one of them. That is, it is possible to use at least one of a sending method in which the comparison portion sends to the judgment portion only one of the binary values that expresses a comparison result that is large or small with regard to the magnitude correlation between the observation information and the target information; or a sending method in which the judgment portion sends to the control portion only one of the binary values that expresses a judgment result that the above-described predetermined condition is met or not met. By doing this, it is possible to simply transmission processing and reception processing, and also to reduce electric power consumption, as described in Embodiment 1. The "one of the binary values that expresses a comparison result that is large or small with regard to the magnitude correlation between the observation information and the target information" refers to one of binary values, observation information≦target information and observation information>target information, or one of the binary values, observation information<target information and observation information≧target information.

In the above-described embodiments, it is explained that it is possible to use broadcast-type communications. It is also possible to use a commonly used communication method for the communications between the lighting devices. In addition to a loop-type network, it is possible to use a mesh-type network, a star-type network, wired communications, wireless communications and the like in each of which communications can be carried out between the lighting devices respectively. Furthermore, a central device that manages all the lighting devices may be arranged in an appropriate location in the network, including a central position for a star-type network, for example. For the network communications for these devices, communication protocols such as those for commonly known LAN, wireless LAN, infrared LAN, Bluetooth (registered trademark) system, electrical wiring LAN, or econet may be used, or a portion of these protocols may be used.

In the above-described case in which the broadcast-type communication method is not used, the central device may issue a single or multiple instances of the variation control permission information Dp and allow the lighting device having the variation control permission information to carry out variation control. By arranging that the lighting devices cannot carry out variation control even when possessing Dp until there are no more "NG"s, there is no excessive application of variation control. The Dp may be set such that each lighting device can only hold one, or the maximum number to be held may be limited and any Dp exceeding that may be set to be forwarded to another lighting device. For a plurality of Dp that are held, only one of these can be used in one time of variation control.

In the above-described case in which the broadcast-type communication method is not used, the lighting devices were set to randomly generate a transmission destination address for the Dp, but the Dp may be transmitted to a neighboring lighting device in accordance with the connection order of the lighting devices.

In the foregoing embodiments, the variation control may be set to wait for a fixed time Ts before being carried out in consideration of a stabilization time for the light intensities of the light sources. Fundamentally, in the foregoing embodiments, each process was described as being performed asynchronously, but the overall system may be configured to operate synchronously in accordance with slots of the time T.

In the foregoing embodiments, the time axis and the amplitude axis of the control value were described as discrete systems, but one or both of the time axis and amplitude axis may be configured as a continuous system.

For example, by giving the light reduction rate instead of single-steps of a predetermined variation amount of the lighting devices and the light-increase rate instead of single-steps of return control, and carrying out light-increase control as return control during "NG"s and carrying out light reduction control as variation control during "OK"s, it is possible to regulate to the desired illumination distribution using the same principle. The lighting devices may change the light reduction rate for variation control each time they carry out return control. The rate for variation control may be changed in such a manner that it is always high or low.

In the above-described embodiments, as the occurrence frequency distribution of "OK", i.e., a judgment that the sampled illumination and the target illumination are in a constant relation, and "NG", i.e., a judgment that they are not in a constant relation, approach, the single step light intensity difference may be made smaller. Furthermore, when multiple instances of Dp are issued, as the occurrence frequency distribution of "OK" and "NG" approach, the number of Dp issued may be reduced. This judgment and processing can be carried out by the central device.

Each single step of the variation amount may be decided in accordance with the resolving power of, for example, the light intensity capable of being produced by the control portions and the lighting devices.

In the foregoing embodiments, the width of control for each light source and the value of a single step are not necessarily according to the various above-described calculations and described methods, and it is possible to use other values within an appropriate range. The case in which the predetermined variation amount is reduced in response to reductions in the differential illumination of the sampled illumination and the target illumination has already been touched upon. A method other than this for reducing the predetermined variation amount as constriction advances may be a method such as the following. Each lighting device may total the number of times of variation control and reduce the predetermined variation amount as the number of times of variation control becomes larger. Also, each lighting device may reduce the predetermined variation amount as time sends from the commencement of control. It may be judged that convergence is advancing as the frequency of variation control and return control approach on average.

The controls in the above-described flowcharts are not limited to those including the above-described steps. It should be emphasized that the contents of each of the steps may not completely match those illustrated, as long as the illustrated functionality can be achieved, and steps other then the illustrated steps may also be included.

The variation amount of the control value in the second return control of the lighting devices may be the same amount as the predetermined variation amount in the variation control, but it may also be a different amount. Furthermore, it may be a value respectively decided for each lighting device. Likewise for the predetermined variation amount, it may be set to a small value as constriction advances. Furthermore, when conducting the return control, it is possible to return to the amount of light prior to carrying out variation control.

In the control system according to the present invention, the variation control may be carried out by selecting any of the plurality of control portions, and the selection can be freely changed and selected without any particular constraint to the prior selection. The same is true for the second return control. Furthermore, in regard to the variation amount and the amount of return control in variation control and the second return control and, except for the variation direction in the control portions, it is possible to various degrees to approach the target illumination using any arbitrary amount without any stringent restrictions, and therefore flexible system design is possible. There may be various algorithms of selection, but the above-described method using random numbers or the aforementioned negotiation can be achieved fundamentally.

From the point of view of electric power saving, a method in which the time density for supplying electric power to the light sources, such as inverter control or triac control, is preferable for controlling the light intensities of the lighting devices. In this case, the instantaneous light intensity involves repeating in alternation the maximum light intensity and the minimum light intensity, that is, repeating in alternation a light on state and a light off state. The mean light intensity is controlled for the lighting devices. The instantaneous illumination sampled by the illumination sampling portion varies widely in accordance with the instantaneous light intensity, and therefore values in which the instantaneous illumination is smoothed are required to be used as the sampled illumination.

The illumination comparing devices may be arranged in predetermined fixed positions in a hall or a conference room, for example hanging midway between the ceiling and the floor, but they may also be movable to arbitrary positions of the hall or conference room as small size devices such as remote control devices. By doing this, the illumination of the arbitrary positions can be controlled to desired values. For example, a specified position on a conference table can be set to a desired brightness. Furthermore, a user can set the target illumination.

When the illumination at each position has sufficiently approached the target illumination, flickering of the illumination may be removed by pausing variation control. To this end, in each embodiment, the lighting devices receive from each of the illumination comparing devices information of the difference between the current illumination and the target illumination, and the size of the difference information is determined at the lighting devices, and, when all have become sufficiently small values, variation control may be set to be paused. Also, variation control may be set to be paused after a time has elapsed that is several times larger than a maximum time Tmax required for convergence.

In order to commence variation control in each of the embodiments, a start button may be provided in the illumination comparing device and a notification may be given of the commencement of the above-described procedure to all the lighting devices and the other illumination comparing devices by broadcast communications when the button is pushed.

Once a state of convergence has been achieved, the respective light intensities of that time are stored such that even when the electric power to all the lighting devices is cut, the light intensities can be reproduced when the electric power is again turned on. Furthermore, when the difference between the sampled illumination and the target illumination in the illumination comparing device becomes too large, the light intensities of all the lighting devices are changed by return control by an appropriate light intensity in a direction reverse to the variation direction in variation control, and the selection of the lighting device j in the foregoing embodiments may be set to commence in the process of variation processing for its light intensity once the relations of the sampled illuminations and the target illuminations are all set to a constant relation. By doing this, it is possible to reach the target illumination in a shorter time than again conducting all the processes from the beginning.

In the foregoing embodiments, multiple processes of variation control may be combined. That is, the variation control of a particular embodiment may proceed at first and at a stage where the target illumination is approached, a transition may be made to variation control according to another embodiment.

While application to an ordinary lighting control is described in the above-described embodiments, the invention can also be applied to colored lighting. Three sets of each of the lighting control systems of the above-described embodiments are configured for three light sources with red, blue and green color, respectively. The sensor in the sampling portion 122 of the illumination comparing device is set to be sensitive to only one of red, blue and green color. By providing illumination comparison portions corresponding respectively to the colors of the above-described three systems in the illumination comparing device disposed at one location, setting a target illumination for each of the three colors, sending a comparison result between the sampled illumination and the target illumination for each color to the judging device corresponding to that color, and sending a judgment result to the lighting device corresponding to that color, it is possible not only to control the illumination of the position at which the illumination comparing device is placed, but also to control the lighting to desired colors.

Furthermore, in the control system of the present invention, when the control values are "a" values (Ai), and different "b" values (Bj), which are determined by the values (Ai), are used as the values of the observation information, the values (Bj) can be caused to approach the values of the target information. Numerical conversion is carried out by a numerical conversion portion into which the values (Ai) are input and from which the values (Bj) are output. When the above-described values (Ai) and values (Bj), and the target information are stored on a memory, the operations and procedures described with reference to the above-described flowcharts can be configured on a computer in the form of numerical processing. That is to say, the control system according to the present invention can be configured on a computer. This system can be used in such uses in which control values (Ai) for causing the values (Bj) of the observation information to approach the target information, and the values (Ai) are utilized as a model in the numerical conversion portion. Regarding the energy, it may be incorporated as a numerical model. That is, the system can also be used for control of phenomena other than physical phenomena such as light intensities and illuminations. Such a usage is also possible for a control system of the embodiments described below.

In each of the above embodiments, the control system is described as a control system for lighting control, but the control system can also be applied to control systems that consume various kinds of energy for purposes other than lighting, as previously discussed.

Moreover, all the processes in the lighting control systems and the control systems in the aforementioned embodiments may be achieved by software. And such software may be distributed by way of a software download or the like. Furthermore, such software may be disseminated by being recorded on a recording medium such as a CD-ROM.

INDUSTRIAL APPLICABILITY

The control system according to the present invention is useful for lighting control systems used inside or outside of buildings, and in halls and other various facilities, and furthermore, it can be utilized for a variety of other control systems for use in temperature control and environment control, for example.

The invention claimed is:

1. A control system, comprising an energy measurement portion, a plurality of control portions, at least one comparison portion, and at least one judgment portion, wherein the energy measurement portion sends to the judgment portion energy information relating to an amount of energy consumed by the control portions, the comparison portion includes a sampling portion that samples observation information and a storage portion that has target information, and sends to the judgment portion a comparison result in which the observation information and the target information are compared, the judgment portion carries out a judgment as to whether a predetermined condition is met, based on the energy information and the comparison result, and sends a result of the judgment to the control portions, the control portions are capable of carrying out, based on the judgment result, variation control in which a current control value is changed by a predetermined variation amount, and return control, the observation information is generated based on control values controlled by the plurality of control potions, the control portions carry out the variation control through at least one of: setting of the predetermined variation amount as an amount that is varied randomly; setting of a return variation amount in the return control as an amount that is varied randomly; random changing of a timing for carrying out the variation control; and random changing of the frequency of the variation control, and return the control amount to a previous value when the energy consumption has increased as a result of the change in the control amount, and, when the judgment is that the predetermined condition is not met after the variation control, the control portions cause the observation information to approach the target information by returning the control amount to a previous value so that the predetermined condition is met.

2. A control system, comprising an energy measurement portion, a plurality of control portions, at least one comparison portion, and at least one judgment portion, wherein the energy measurement portion sends to the judgment portion energy information relating to an amount of energy consumed by the control portions, the comparison portion includes a sampling portion that samples observation information and a storage portion that has target information, and sends to the judgment portion a comparison result in which the observation information and the target information are compared, the judgment portion carries out a judgment as to whether a predetermined condition is met, based on the energy information and the comparison result, and sends a result of the judgment to the control portions, the control portions are capable of carrying out, based on the judgment result, variation control in which a current control value is changed by a predetermined variation amount, and return control, the observation information is generated based on control values controlled by the plurality of control potions, the control portions carry out the variation control by through at least one of: setting of the predetermined variation amount as an amount that is varied randomly; setting of a return variation amount in the return control as an amount that is varied randomly; random changing of a timing for carrying out the variation control; and random changing of the frequency of the variation control, and return the control amount to a previous value when the energy consumption has increased as a result of the change in the control amount, and, when the judgment is that the predetermined condition is not met after the variation control, at least a part of the control portions causes the observation information to approach the target information by carrying out return control so that the predetermined condition is met.

3. The control system according to claim 1 or 2, wherein at least one of the selection of the control portions that increase/decrease the control amount, the magnitude of the increase/decrease of the control amount, and the frequency of the increase/decrease of the control amount is changed.

4. The control system according to claim 1 or 2, wherein when there is a single comparison portion in the control system, the judgment portion judges that the predetermined condition is met when the observation information is in a constant relation with the target information and judges that the predetermined condition is not met when the observation information is not in a constant relation with the target information, and, when there are at least two comparison portions, the control portions judge that the predetermined condition is met when the observation information are all in a constant relation with the corresponding target information and judges that the predetermined condition is not met when even one is not in a constant relation, and wherein the constant relation is a relation in which the observation information is larger than the corresponding target information.

5. The control system according to claim 1 or 2, wherein, when the control values of all the control portions are set to their respective maximum values or the predetermined condition is not met, before selection of the control portions, the respective control values of all the control portions are changed in a direction of variation in the return control so that the predetermined condition is met.

6. The control system according to claim 1 or 2, wherein all the plurality of control portions carry out the return control.

7. The control system according to claim 1 or 2, wherein the return variation amount is a return variation amount by which a state before the previous variation control is restored, or an arbitrary variation amount that is returned to a direction reverse to a direction of control in the previous variation control so that the predetermined condition is met.

8. The control system according to claim 1 or 2, wherein the observation information is caused to approach the target information by applying at least one of a sending method in which, when the comparison result is expressed as two values, the comparison portion sends to the judgment portion only one state of the two values as the comparison result and a sending method in which the judgment portion sends to the control portions only one judgment result that the predetermined condition is met or not met.

9. The control system according to claim 1 or 2, wherein the judgment portion is provided corresponding to each of the plurality of control portions.

10. The control system according to claim 1 or 2, wherein at least one of the predetermined variation amount and the return variation amount is a variation amount based on a difference between the observation information and the target information.

11. The control system according to claim 1 or 2, wherein at least one of the predetermined variation amount and the return variation amount is set for each of the control portions.

12. The control system according to claim 1 or 2, wherein at least one of the predetermined variation amount and the return variation amount is reduced in response to a convergence in which the observation information approaches the target information, or reduced along with a passing of time until the convergence.

13. The control system according to claim 1 or 2, wherein the number of control portions selected from the control portions to increase/decrease the control amount is caused to approach one in response to a convergence in which the observation information approaches the target information.

14. The control system according to claim 1 or 2, wherein at least one of the control value in the variation control and the control value in the return control is varied continuously.

15. The control system according to claim 1 or 2, wherein at least one of the control value of the plurality of control portions, the observation information and the target information is output to a display.

16. The control system according to claim 1 or 2, wherein control values of the control portions at a final stage of the convergence can be stored, and the control portions are capable of reproducing the control based on the stored control values by receiving an instruction.

17. The control system according to claim 1 or 2, wherein a plurality of the comparison portions are provided, and at least one partial judgment portion that obtains a comparison result from a part of the comparison portions to carry out a judgment is provided, the partial judgment portion carries out the judgment as a partial judgment for the obtained comparison result, and, when there is any comparison portion that is not judged by the partial judgment portion, the judgment portions adds a comparison result of that comparison portion to the partial judgment result of the partial judgment portion, and carries out the judgment based on the partial judgment result of the partial judgment portion, when there is no comparison portion that is not judged by the partial judgment portion.

18. The control system according to claim 1 or 2, wherein at lest one of transmission in which the comparison portion sends the comparison result to the judgment portion, transmission in which the partial judgment portion sends the partial judgment result to the judgment portion, and transmission in which the judgment portion sends the judgment result to the control portions is wireless transmission.

19. The control system according to claim 1 or 2, the control system being used for lighting control, wherein the control portions are lighting devices, the comparison portion is an illumination comparing device, the judgment portion is a judging device, the control value is a light intensity of light sources of the lighting devices, the observation information is sampled illumination at an observation position, and the target information is a target illumination.

20. A light source constituting the control system according to claim 19.

21. A lighting device constituting the control system according to claim 19.

22. An illumination comparing device constituting the control system according to claim 19.

23. A judgment device constituting the control system according to claim 19.

24. A control system, comprising an energy measurement portion, a plurality of control portions, at least one comparison portion, and at least one judgment portion, wherein the energy measurement portion sends to the judgment portion energy information relating to energy consumed by the control portions, the comparison portion sends to the judgment portion a comparison result in which observation information of an arbitrary position and target information are compared, the judgment portion carries out a judgment as to whether a predetermined condition is met, based on the energy information and the comparison result, and sends a result of the judgment to the control portions, the control portions repetitively increase/decrease a control amount based on the judgment result obtained from the judgment portion, and, when the energy consumption has increased or has not decreased as a result of the increase/decrease of the control amount, cause the observation information to approach the target information by returning the control amount to a previous value, when there is a single comparison portion in the control system, the judgment portion judges that the predetermined condition is met when the observation information is in a constant relation with the target information and judges that the predetermined condition is not met when the observation information is not in a constant relation with the target information, and, when there are at least two comparison portions, the control portions judge that the predetermined condition is met when the observation information are all in a constant relation with the corresponding target information and judges that the predetermined condition is not met when even one is not in a constant relation, and wherein the constant relation is a relation in which the observation information is larger than the corresponding target information.

* * * * *